United States Patent [19]

Konchan

[11] Patent Number: 5,470,001
[45] Date of Patent: Nov. 28, 1995

[54] JARS FOR CARRYING FISHERMAN'S BAIT AND SUPPORT MEMBER FOR THE JARS

[76] Inventor: Larry L. Konchan, 1614 Christopher St., Johnstown, Pa. 15905

[21] Appl. No.: 238,656

[22] Filed: May 5, 1994

[51] Int. Cl.⁶ .................................................. A45F 5/00
[52] U.S. Cl. ........................ 224/253; 224/240; 224/224; 224/920
[58] Field of Search ....................... 224/148, 253, 224/250, 920, 908, 224, 240, 236, 203; 220/480, 737, 375, 481, 482; 248/102

[56] References Cited

U.S. PATENT DOCUMENTS

| | | | |
|---|---|---|---|
| 2,958,439 | 11/1960 | Yochem | 220/375 |
| 3,065,873 | 11/1962 | Plate | 248/102 |
| 3,860,135 | 1/1975 | Yung et al. | 220/375 |
| 4,345,704 | 8/1982 | Boughton | 224/148 |
| 4,449,654 | 5/1984 | Cappis | 224/224 |
| 4,757,927 | 7/1988 | Rutty | 224/253 |
| 4,793,394 | 12/1988 | Cohen | 224/250 |
| 4,871,597 | 10/1989 | Hobson | 224/224 |
| 5,024,018 | 6/1991 | Ferrigno | 224/253 |
| 5,102,020 | 4/1992 | Walker et al. | 220/480 |
| 5,240,158 | 8/1993 | Walsh | 224/148 |

Primary Examiner—Henry J. Recla
Assistant Examiner—Gregory M. Vidovich

[57] ABSTRACT

Apparatus for carrying fisherman's bait comprising a jar in a cylindrical configuration with side walls, an integral bottom wall, an upper end and a removable cap, with a strap coupling one edge of each cap with adjacent section of an associated side wall, each cap having a forwardly extending flap extending beyond its associated side wall on the side of the lid remote from the strap, each side wall having an outstanding annular rib adjacent to the upper end of the side wall.

1 Claim, 4 Drawing Sheets

PRIOR ART

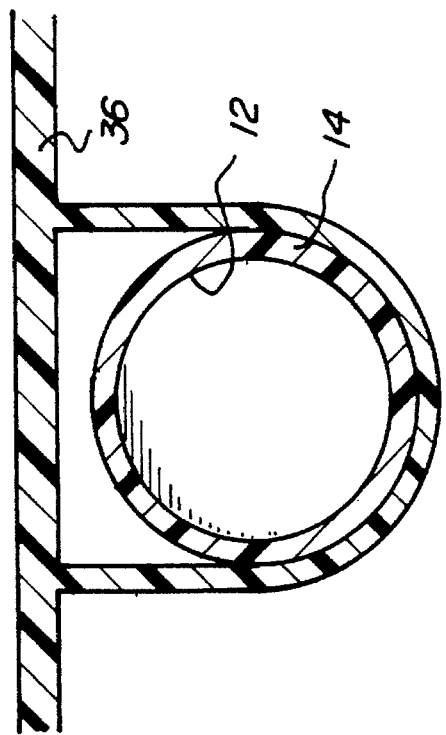
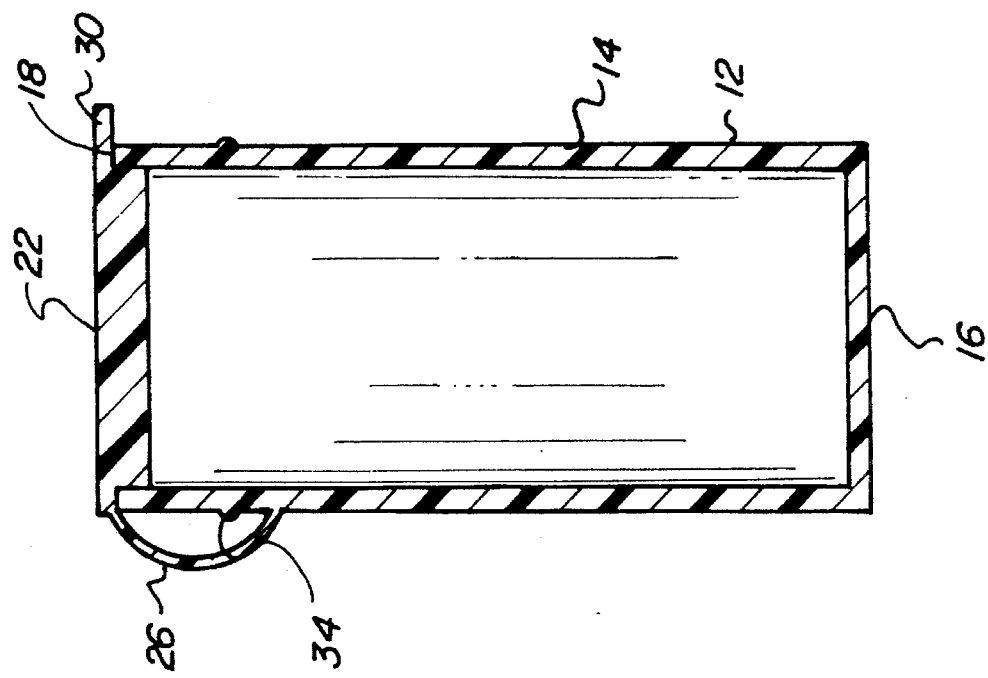

JARS FOR CARRYING FISHERMAN'S BAIT AND SUPPORT MEMBER FOR THE JARS

BACKGROUND OF THE INVENTION

1. Field of the Invention

The present invention relates to jars for carrying fisherman's bait and support member for the jars and more particularly pertains to supporting a plurality of jars carrying a variety of bait for fishermen.

2. Description of the Prior Art

The use of belt supporting devices and bait carrying containers is known in the prior art. More specifically, belt supporting devices and bait carrying containers heretofore devised and utilized for the purpose of supporting various devices on belts and carrying bait in jars are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,815,416 to Wolff a worm container.

U.S. Pat. No. 4,226,335 to Sowards discloses a device for dispensing fish eggs.

U.S. Pat. No. 4,133,452 to Wiltrout discloses a salmon egg dispenser.

U.S. Pat. No. 4,158,267 to Farnsworth discloses a little bugger insect carrying and dispensing container.

U.S. Pat. No. 4,030,226 to Shelton, Sr et al. discloses an insect carrier and dispenser apparatus.

In this respect, the jars for carrying fisherman's bait and support member for the jars according to the present invention substantially departs from the conventional concepts and designs of the prior art, and in doing so provides an apparatus primarily developed for the purpose of supporting a plurality of jars carrying a variety of bait for fishermen.

Therefore, it can be appreciated that there exists a continuing need for new and improved jars for carrying fisherman's bait and support member for the jars which can be used for supporting a plurality of jars carrying a variety of bait for fishermen. In this regard, the present invention substantially fulfills this need.

SUMMARY OF THE INVENTION

In view of the foregoing disadvantages inherent in the known types of belt supporting devices and bait carrying containers now present in the prior art, the present invention provides an improved jars for carrying fisherman's bait and support member for the jars. As such, the general purpose of the present invention, which will be described subsequently in greater detail, is to provide a new and improved jars for carrying fisherman's bait and support member for the jars and method which has all the advantages of the prior art and none of the disadvantages.

To attain this, the present invention essentially comprises a new and improved jars assembly for carrying fisherman's bait and support member for the jars comprising, in combination, a plurality of jars, each jar being molded of a plastic material in a cylindrical configuration with side walls, an integral bottom wall, an upper end and a removable cap, with a strap coupling one edge of each cap with adjacent section of an associated side wall, each cap having a forwardly extending flap extending beyond its associated side wall on the side of the lid remote from the strap, each side wall having an outstanding annular rib adjacent to the upper end of the side wall; and a flexible strap having long parallel horizontal side walls and short parallel vertical end walls perpendicular to the side walls, the strap having vertical elongated aperture adjacent to the end walls for the passage of the belt of a user for coupling the strap to the user, a plurality of C-shaped strips in vertically aligned pairs at spaced locations along the length of the strap between the end walls, the strips being of a common size to allow the passage of the lower end of the jar downwardly through the top strip to the bottom strip of each pair with the annular rib resting on the upper surface of the top strip.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved jars for carrying fisherman's bait and support member for the jars which have all the advantages of the prior art belt supporting devices and bait carrying containers and none of the disadvantages.

It is another object of the present invention to provide new and improved jars for carrying fisherman's bait and support member for the jars which may be easily and efficiently manufactured and marketed.

It is further object of the present invention to provide new and improved jars for carrying fisherman's bait and support member for the jars which are of durable and reliable constructions.

An even further object of the present invention is to provide new and improved jars for carrying fisherman's bait and support member for the jars which are susceptible of a low cost of manufacture with regard to both materials and labor, and which accordingly are then susceptible of low prices of sale to the consuming public, thereby making such jars for carrying fisherman's bait and support member for the jars economically available to the buying public.

Still yet another object of the present invention is to provide new and improved jars for carrying fisherman's bait and support member for the jars which provide in the apparatuses and methods of the prior art some of the advantages thereof, while simultaneously overcoming some of the disadvantages normally associated therewith.

Still another object of the present invention is to support a plurality of jars carrying a variety of bait for fishermen.

Lastly, it is an object of the present invention to provide new and improved apparatus for carrying fisherman's bait comprising a jar in a cylindrical configuration with side walls, an integral bottom wall, an upper end and a removable cap, with a strap coupling one edge of each cap with adjacent section of an associated side wall, each cap having a forwardly extending flap extending beyond its associated side wall on the side of the lid remote from the strap, each side wall having an outstanding annular rib adjacent to the upper end of the side wall.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross sectional view taken along line 6—6 of FIG. 5.

FIG. 7 is a cross sectional view taken along line 7—7 of FIG. 5.

The same reference numerals refer to the same parts through the various Figures.

DESCRIPTION OF THE PREFERRED EMBODIMENT

Figure 1:
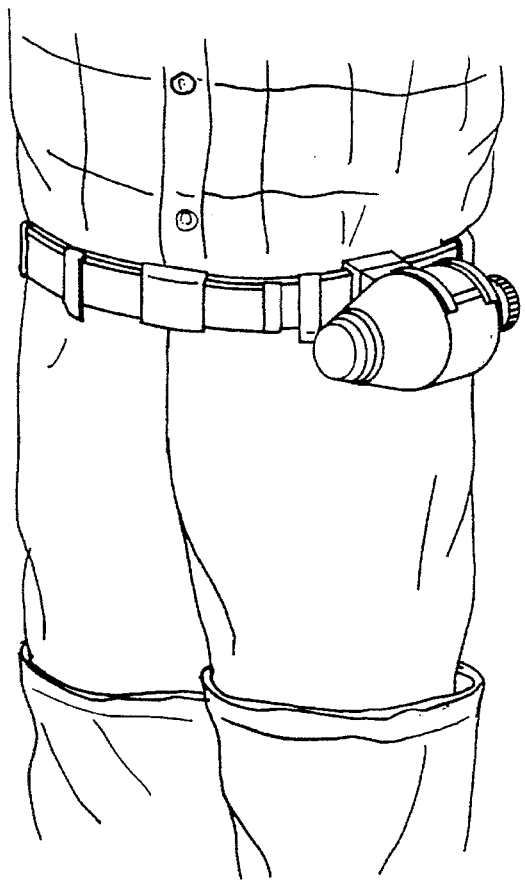
FIG. 1 is a perspective illustration of a prior art device for carrying bait on a fisherman's belt.
Figure 2:
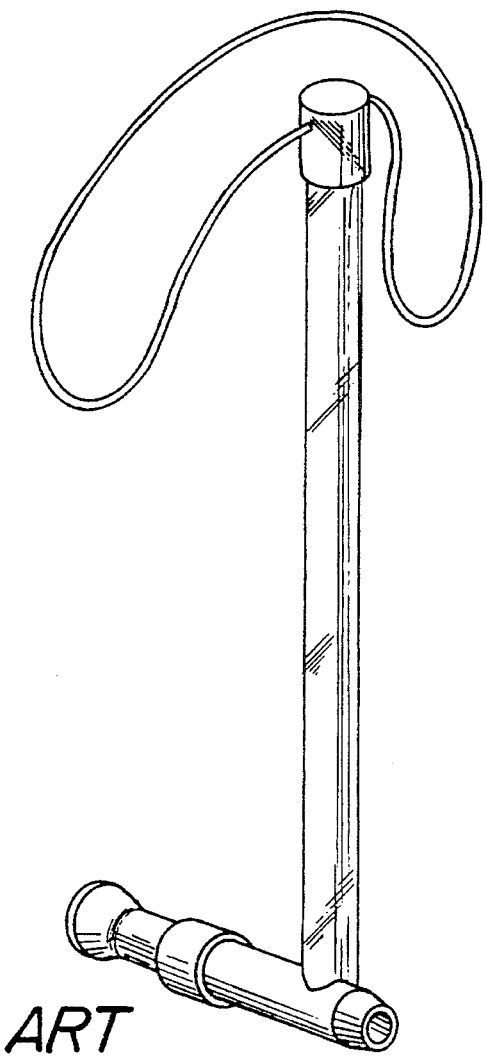
FIG. 2 is another prior art device for carrying bait adapted to be supported by a fisherman.
Figure 3:
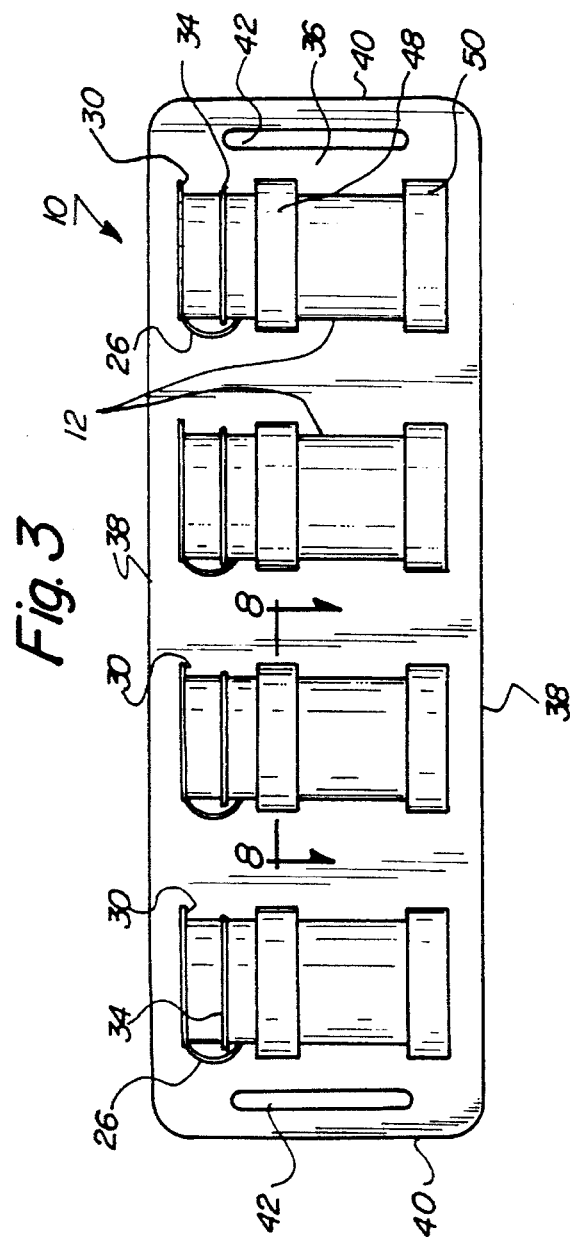
FIG. 3 is a front elevational view of the preferred embodiment of the new and improved jars for carrying fisherman's bait and support member for the jars constructed in accordance with the principles of the present invention.
Figure 4:
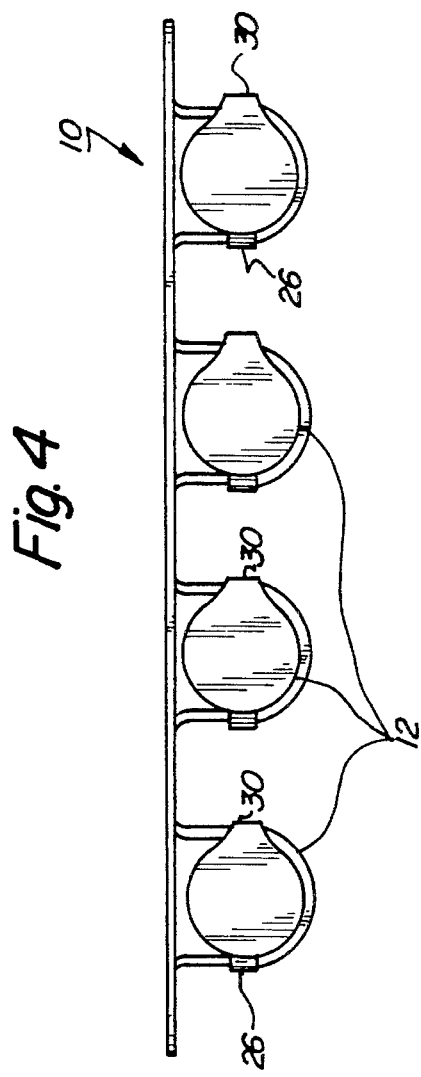
FIG. 4 is a top elevational view of the device as illustrated in FIG. 3.
Figure 5:
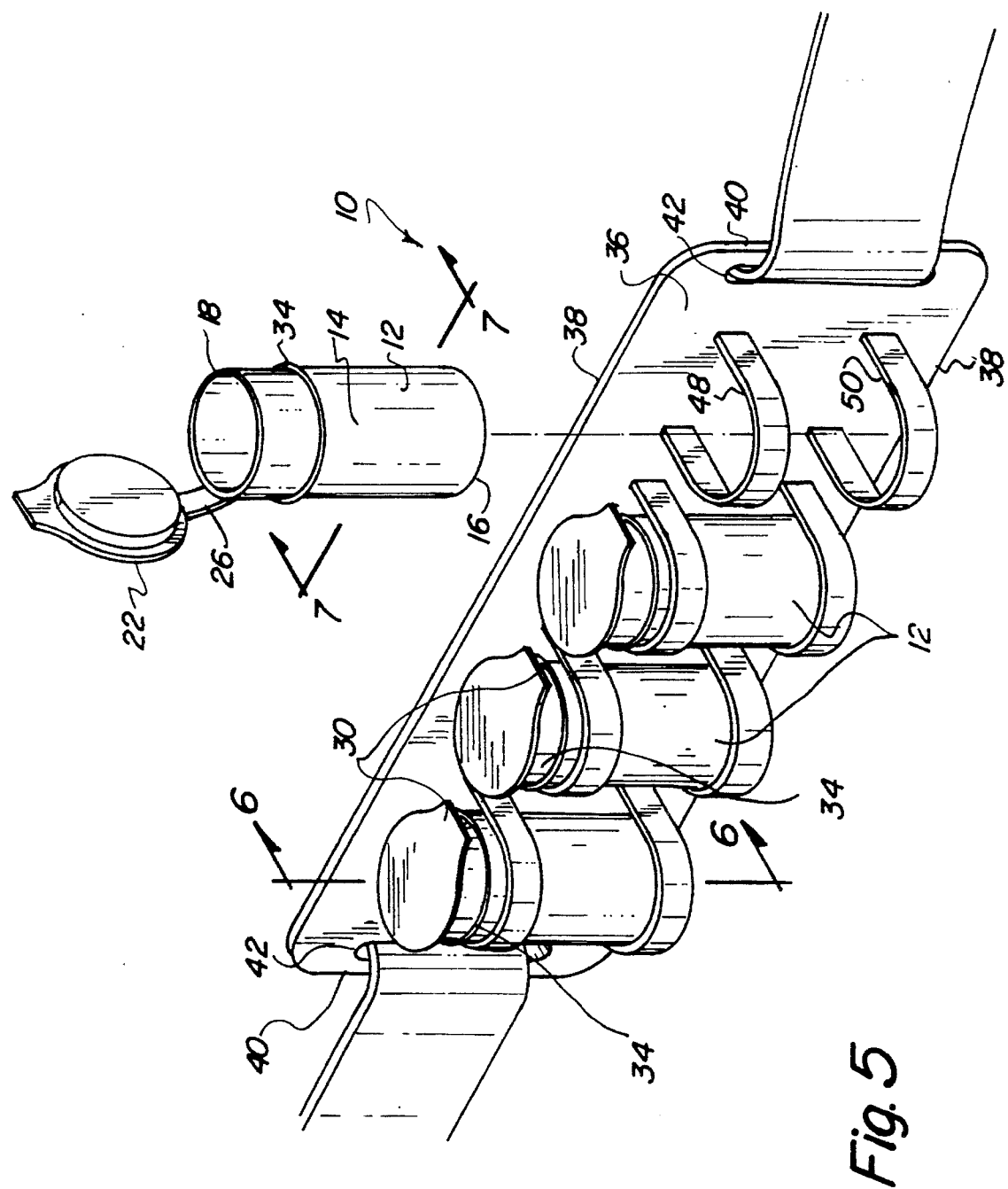
FIG. 5 is a perspective illustration of the device shown in FIGS. 3 and 4.

With reference now to the drawings, and in particular to FIG. 1 thereof, the preferred embodiment of the new and improved jars for carrying fisherman's bait and support member for the jars embodying the principles and concepts of the present invention and generally designated by the reference numeral 10 will be described.

Specifically, the present invention is comprised of a plurality of components. In their broadest context, such components include a plurality of jars each with a lid and an annular rib in combination with a flexible strap, the flexible strap having C-shaped strips for supporting the jars with the annular rib supported thereon. Such components are individually configured and correlated with respect to each other so as to attain the desired objective.

More specifically, the system 10 includes a plurality of similarly configured jars 12. Each jar is molded or otherwise fabricated of a rigid material, preferably a plastic material. Each jar is configured in a cylindrical configuration with side walls 14. Each jar also has an integral bottom wall 16 and an upper end 18 along 20. Also provided in association therewith is a removable cap 22.

Coupling between the cap and jar is through a short strap 26. Such short strap couples one edge of each cap with an adjacent section of an associated side wall. Each cap also has a forwardly extending flap 30. Such flap extends beyond its associated side wall on the side of the lid remote from the strap. The flap is for grasping to allow a user to more readily open the container by lifting the cap with respect to the jar.

Also provided in association with each jar is an outstanding annular rib 34. The annular rib extends in a circular configuration around the jar adjacent to the upper end of the side wall. The purpose of the annular rib will be described in greater detail hereinafter.

The next major component of the system 10 is a flexible strap 36. Such strap has long parallel horizontal side walls 38 and short parallel vertical end walls 40. The vertical walls are perpendicular to the horizontal walls. In addition, the strap has a vertically elongated apertures 42 adjacent to the end walls. Such apertures are for the passage of the belt of a user. In this manner, the flexible strap may be coupled to the user, normally a fisherman.

Located on the flexible strap are a plurality of C-shaped strips. The strips are in vertically aligned pairs at spaced locations along the length of the flexible strap between the end wall. The strips are of a common sized correlated to the size of the jars. They are such as to allow the passage of the lower end of the jar downwardly through the top strip 48 to the bottom strip 50 of each pair. When so positioned, the annular rib of the jar rests upon the upper surface of the top strip. In this manner, the jar will be retained in a location for easy access by the fisherman during operation and use. The jar may thus be readily lifted out of the strips away from the flexible strap and positioned therein without falling through the strips.

The present invention is a waist belt which is used to hold bait. Some avid anglers carry several types of bait, including salmon eggs, dried crickets, grasshoppers and whole kernel corn. All are contained in glass or plastic bottles with plastic being preferred because it does not shatter. Since the eggs are available in several colors, including red, pink, yellow and white, a number of containers are mounted on the belt. Unlike other bait bottles which have separate lids which can easily be lost, these containers are provided with snap close hinged lids and are not removed. The bait is packed at home while preparing for the trip, or when at the side of the stream.

The present invention is a flat plastic strip, about 2¾ inches in width and 8½ inches long, which has slots at each end so a belt can be inserted through it. It has loops that fit over the bait bottles, which are about 1 inch in diameter. The loops are mounted in 2 inch centers, with two provided for each bottle. This spacing makes it easy to handle each bait bottle individually, without dislodging the others.

The carriers can also be made in other sizes and from other materials. Many people will prefer one that is made of leather of its durability. In either form, this is the most convenient way to carry bait. Unlike bait boxes, it is always with the angler, but is never in the way. It leaves both hands free for the main task of enticing and catching of fish.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An assembly for carrying fisherman's bait comprising, in combination:

a plurality of jars, each jar being molded of a plastic material in a cylindrical configuration with a cylindrical side wall, an integral bottom wall, an open upper end and a removable imperforate cap in connection with said upper end, with a strap coupling one edge of each cap with an adjacent section of an associated side wall of said jars, each cap having a forwardly extending flap extending beyond its associated side wall on the side of the lid remote from the strap, each side wall having an outstanding annular rib adjacent to the upper end of the side wall; and a flexible member having long parallel horizontal side edges and short parallel vertical end edges, the member being imperforate except for two vertical elongated apertures, one of said apertures located adjacent to one of the end edges and the other of said apertures located adjacent the other of said end edges wherein both of said apertures being adapted for the passage of a belt of a user for coupling the member to the user, a plurality of separate top and bottom strips in vertically aligned pairs at spaced locations along the length of the member between the end edges, the top and bottom strips being of a common size to allow the passage of the lower end of one of the jars downwardly through the top strip to the bottom strip of each pair of said strips with the annular rib adjacent to and abutting an upper surface of the respective top strip.

* * * * *